United States Patent
Fukushima et al.

(10) Patent No.: US 7,050,216 B2
(45) Date of Patent: May 23, 2006

(54) VARIABLE OPTICAL FILTER

(75) Inventors: Nobuhiro Fukushima, Kanagawa (JP); Hidenori Nakada, Aichi (JP); Tsugio Tokumasu, Shizuoka (JP); Yuko Ota, Shizuoka (JP)

(73) Assignees: Fujitsu Limited, Kanagawa (JP); FDK Corporation, Tokyo (JP)

( * ) Notice: Subject to any disclaimer, the term of this patent is extended or adjusted under 35 U.S.C. 154(b) by 0 days.

(21) Appl. No.: 11/009,991

(22) Filed: Dec. 10, 2004

(65) Prior Publication Data

US 2005/0134954 A1 Jun. 23, 2005

Related U.S. Application Data

(63) Continuation of application No. PCT/JP03/07279, filed on Jun. 9, 2003.

(30) Foreign Application Priority Data

Jun. 10, 2002 (JP) .............................. 2002-169028

(51) Int. Cl.
G02F 1/09 (2006.01)
(52) U.S. Cl. ...................................... 359/283; 359/280
(58) Field of Classification Search ................ 359/246, 359/280, 283, 322, 484, 494, 497, 498, 501, 359/578; 250/225; 356/364, 365
See application file for complete search history.

(56) References Cited

U.S. PATENT DOCUMENTS 6,826,318 B1 * 11/2004 Nagaeda et al. .............. 385/11

FOREIGN PATENT DOCUMENTS

JP 6-130339 A 5/1994

OTHER PUBLICATIONS

International Search Report—PCT/JP03/07279; ISA/JPO; Mailed: Aug. 19, 2003.

* cited by examiner

Primary Examiner—Ricky L. Mack
Assistant Examiner—William Choi
(74) Attorney, Agent, or Firm—Harness, Dickey & Pierce, P.L.C.

(57) ABSTRACT

A variable optical filter comprises a first polarizer, a first phase difference element operable to generate a phase difference, a variable Faraday rotator operable to impart a variable Faraday rotation, a second phase difference element operable to generate a phase difference, and a second polarizer, wherein said polarizers, said variable Faraday rotator, and said phase difference elements are arranged in the mentioned order along the optical axis, and wherein when the angles formed by the optic axes of said first and second phase difference elements and the transmitted polarization azimuth of the first polarizer are assumed respectively to be $\phi_1$ and $\phi_2$, these $\phi_1$ and $\phi_2$ are set to different angles.

13 Claims, 12 Drawing Sheets

VARIABLE OPTICAL FILTER

CROSS-REFERENCE TO RELATED APPLICATIONS

This application is a continuation of the International Application No. PCT/JP03/07279 filed on Jun. 9, 2003 designating the United States of America.

BACKGROUND OF THE INVENTION

1. Field of the Invention

The present invention relates generally to a variable optical filter used, for example, in an optical communication system, and more particularly, to a variable optical filter that has two phase difference elements disposed at the front and back, respectively, of a variable Faraday rotator in an optical path and sets the optic axes of the two phase difference elements in different azimuths to ensure improved linearity (linearity when transmittance is expressed in logarithmic form) over a wide operational slope range.

2. Description of the Related Art

In the wavelength division multiplexing (WDM) communication, one or a plurality of optical amplifiers such as erbium-doped fiber amplifiers (EDFA) are incorporated in each repeater to amplify an attenuated signal for transmission over a long distance. In this case, the amplification vs. wavelength characteristic of the EDFA affects the communication quality. Despite the correction made on each of the EDFAs using a fixed optical gain equalizer, the EDFAs develop a slope in the wavelength characteristic due to their secular change and variations in the input signal light. If this slope accumulates in a plurality of the concatenated EDFAs, the optical signal-to-noise deteriorates in channels with a large loss.

A variable optical filter is used to correct this slope. The related art includes a variable optical filter having a first polarizer, a phase difference element, a variable Faraday rotator and a second polarizer arranged in this order along the optical axis. See Japanese Patent Application Laid-open Publication No. 11-212044.

If the wavelength slope characteristic is compensated for with such a variable optical filter, the transmittance has dependency on the rotation angle of the variable Faraday rotator and the wavelength, and the wavelength characteristic of the phase difference elements changes like a trigonometric function. In general, however, the slope of the EDFAs is known to vary linearly when the wavelength characteristic thereof is expressed in logarithmic form. Despite the demand to correct this slope with the utmost accuracy, the related art has failed to sufficiently meet this demand.

SUMMARY OF THE INVENTION

It is an object of the present invention to provide a variable optical filter capable of improving the linearity in the loss vs. wavelength characteristic expressed in logarithmic form over a given wide range of operating bandwidths. It is another object of the present invention to provide a variable optical filter capable of reducing variations in the mean insertion loss over a given wide range of operating bandwidths.

An aspect of the present invention provides a variable optical filter having a first polarizer, a first phase difference element operable to generate a phase difference, a variable Faraday rotator operable to impart a variable Faraday rotation, a second phase difference element operable to generate a phase difference, and a second polarizer, wherein the polarizers, the variable Faraday rotator, and the phase difference elements are arranged in the mentioned order along the optical axis, and wherein when the angles formed by the optic axes of the first and second phase difference elements and the transmitted polarization azimuth of the first polarizer are assumed respectively to be $\phi_1$ and $\phi_2$, these $\phi_1$ and $\phi_2$ are set to different angles.

Another aspect of the present invention provides a variable optical filter having a first polarizer, a first phase difference element operable to generate a phase difference, a variable Faraday rotator operable to impart a variable Faraday rotation, a second phase difference element operable to generate a phase difference, and a second polarizer, wherein the polarizers, the variable Faraday rotator, and the phase difference elements are arranged in the mentioned order along the optical axis, wherein when the rotation direction of a rotation angle $\theta$ of the Faraday rotator is positive, an angle $\delta$ formed by the transmitted polarization azimuths of the first and second polarizers is set $\delta>0$, the angle $\phi_1$ formed by the optic axis of the first phase difference element and the transmitted polarization azimuth of the first polarizer is set $\phi_1<0$, and the angle $\phi_2$ formed by the optic axis of the second phase difference element and the transmitted polarization azimuth of the first polarizer is set $\phi_2<0$, and wherein the angles $\phi_1$ and $\phi_2$ are set $\phi_1 \neq \phi_2$.

The other features and objects than the above of the present invention will become more apparent from the following description when read in conjunction with the accompanying drawings.

For more fully understanding of the present invention and the advantages thereof, reference should be made to the following description and the attached drawings.

DETAILED DESCRIPTION OF THE INVENTION

At least the following will become apparent by reference to the description herein and the annexed drawings.

Figure 1:
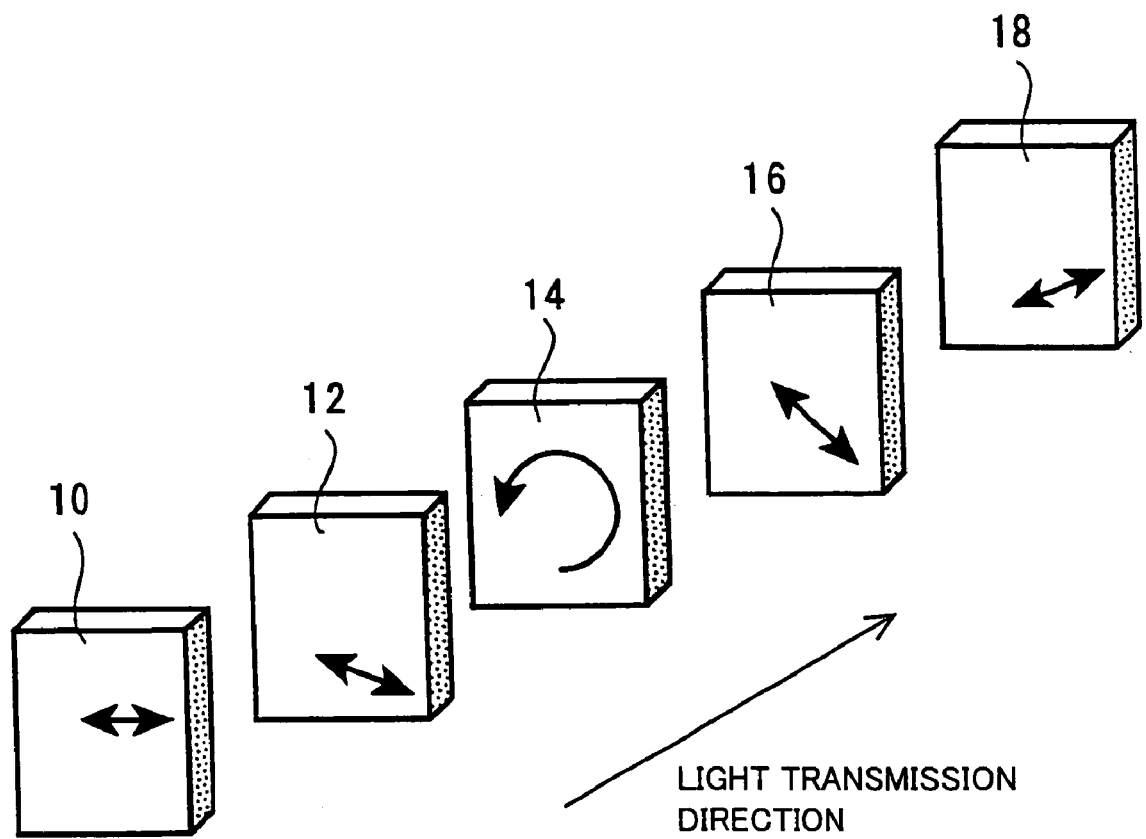
FIG. 1 is an explanatory view showing a basic configuration of a variable optical filter according to the present invention.
Figure 2:
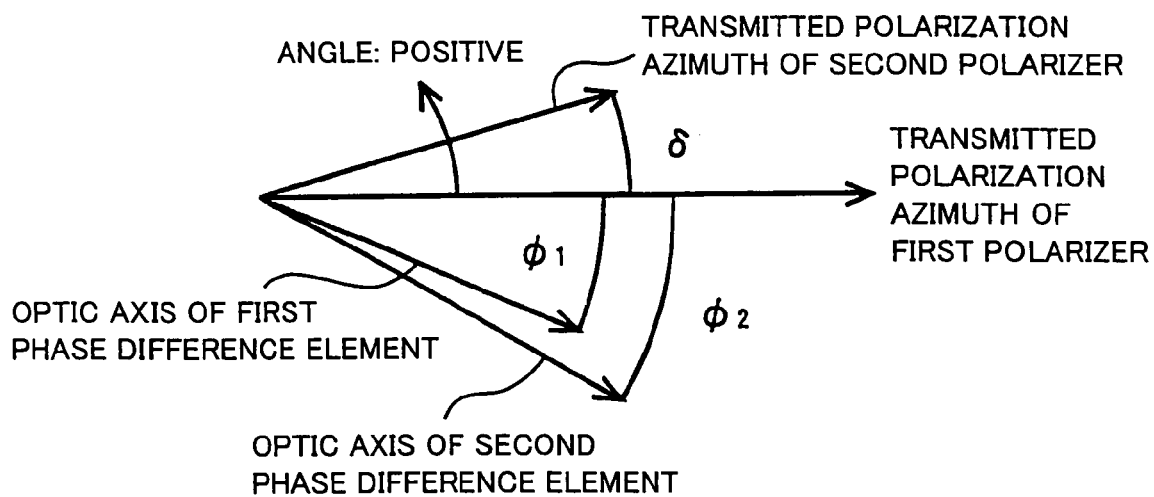
FIG. 2 is an explanatory view showing the relationship between transmitted polarization azimuths and optic axes of the variable optical filter.

FIG. 1 shows a basic configuration of a variable optical filter according to the present invention. This variable optical filter has a first polarizer 10, a first phase difference element 12 operable to generate a phase difference, a variable Faraday rotator 14 operable to impart a variable Faraday rotation, a second phase difference element 16 operable to generate a phase difference and a second polarizer 18 arranged in this order along the optical axis. As shown in FIG. 2, when the angles formed by the optic axes of the first and second phase difference elements and the transmitted polarization azimuth of the first polarizer are assumed respectively to be $\phi_1$ and $\phi_2$, these $\phi_1$ and $\phi_2$ are set to different angles (i.e., $\phi_1 \neq \phi_2$). More preferably, when the rotation direction of a rotation angle $\theta$ of the Faraday rotator is positive ($\theta > 0$), an angle $\delta$ formed by the transmitted polarization azimuths of the first and second polarizers is set $\delta > 0$, the angle $\phi_1$ formed by the optic axis of the first phase difference element and the transmitted polarization azimuth of the first polarizer is set $\phi_1 < 0$, and the angle $\phi_2$ formed by the optic axis of the second phase difference element and the transmitted polarization azimuth of the first polarizer is set $\phi_2 < 0$.

Light passes in succession through the first polarizer 10, the first phase difference element 12, the variable Faraday rotator 14, the second phase difference element 16 and the second polarizer 18. If the Faraday rotation angle changes in this configuration, the wavelength dependency of the transmitted light intensity changes accordingly. At this time, depending on the combination of the difference in optic axis azimuth between the first and second phase difference elements, the wavelength dependency of the phase difference, the dependency on the rotation angle of the variable Faraday rotator and the wavelength and the transmitted polarization azimuths of the first and second polarizers, the wavelength dependency of the intensity of transmitted light that has passed through the second polarizer has a nonlinearity when expressed in antilogarithmic form and is close to a straight line when expressed in logarithmic form at an arbitrary Faraday rotation angle in the operational range. The reason is that when the wavelength characteristics of the first and second phase difference elements are combined, at least one combination is present that provides the optimal linearity. Here, the positive and negative slopes are cancelled out in opposite directions. Therefore, the phase difference elements are provided one at the front and the other at the back of the variable Faraday rotator to ensure that the angles formed by the optic axes are different in the two cases.

When the phase differences generated by the first and second phase difference elements are assumed to be $\Delta_1$ and $\Delta_2$ respectively, at least one of them is preferably set to $(2n+1)\lambda/4$ within a transmission band given in advance (where $\lambda$ is an arbitrary wavelength within the given transmission band).

A preferred example of variable optical filter offers the phase difference $\Delta_1$ of $13/4\lambda_0 \leq \Delta_1 \leq 49/4\lambda_0$ for the first phase difference element and the phase difference $\Delta_2$ of $13/4\lambda_0 \leq \Delta_2 \leq 49/4\lambda_0$ for the second phase difference element when the center wavelength in the given transmission band is assumed to be $\lambda_0$, and ensures variations in mean insertion loss of 0.5 dB or less at the transmission bandwidth of 40 nm and over the wavelength slope from −5 dB to +5 dB.

Another preferred example of variable optical filter offers the phase difference $\Delta_1$ of $13/4\lambda_0 \leq \Delta_1 \leq 49/4\lambda_0$ for the first phase difference element and the phase difference $\Delta_2$ of $13/4\lambda_0 \leq \Delta_2 \leq 49/4\lambda_0$ for the second phase difference element when the center wavelength in the given transmission band is assumed to be $\lambda_0$, and provides a linearity of 0.2 dB or less in the loss vs. wavelength characteristic at the transmission bandwidth of 40 nm and over the wavelength slope from −5 dB to +5 dB.

Still another preferred example of variable optical filter offers the phase difference $\Delta_1$ of $13/4\lambda_0 \leq \Delta_1 \leq 49/4\lambda_0$ for the first phase difference element and the phase difference $\Delta_2$ of $13/4\lambda_0 \leq \Delta_2 \leq 49/4\lambda_0$ for the second phase difference element when the center wavelength in the given transmission band is assumed to be $\lambda_0$ and the wavelength outside the band is $\lambda$, and provides a linearity of 0.2 dB or less in the loss vs. wavelength characteristic and a variable slope range of −6.5 dB to +6.5 dB at the transmission bandwidth of 40 nm and over the wavelength slope from −5 dB to +5 dB.

It is to be noted that the ranges of the phase differences $\Delta_1$ and $\Delta_2$ in these preferred examples have been derived as requirements in the process of finding, through simulation under different sets of conditions, a combination that would provide an excellent linearity with the transmittance expressed in logarithmic form. The optimal characteristic can be delivered when other parameters ($\phi_1$, $\phi_2$, $\delta$) are properly set within the ranges of the phase differences $\Delta_1$ and $\Delta_2$.

The Faraday rotator preferably comprises a magneto-optical crystal provided in the optical path, a first magnetic field application device operable to magnetically saturate the magneto-optical crystal and a second magnetic field application device operable to apply a variable magnetic field in the direction not parallel to the direction of the magnetic field applied by the first magnetic field application device. The optical filter may take on a configuration having the wedge-shaped first and second polarizers made of a birefringence material, with the polarizers arranged such that the top and bottom portions thereof are oriented in opposite directions to each other, and having the first and second phase difference elements in the shape of a flat plate. In this case, the optic axis azimuths of the first polarizer and the first phase difference element are preferably orthogonal to each other when viewed in the direction of the optical axis. The temperature characteristic can be improved as a whole if the materials of the first and second phase difference elements are changed so that the refraction index variation vs. temperature characteristics of the two elements are opposite in sign.

For example, quartz, yttrium vanadate ($YVO_4$), lead molybdate ($PbMoO_4$) and rutile ($TiO_2$) are among the materials that can be used for the first and second phase difference elements in the present invention.

<<Embodiment>>

Figure 3:
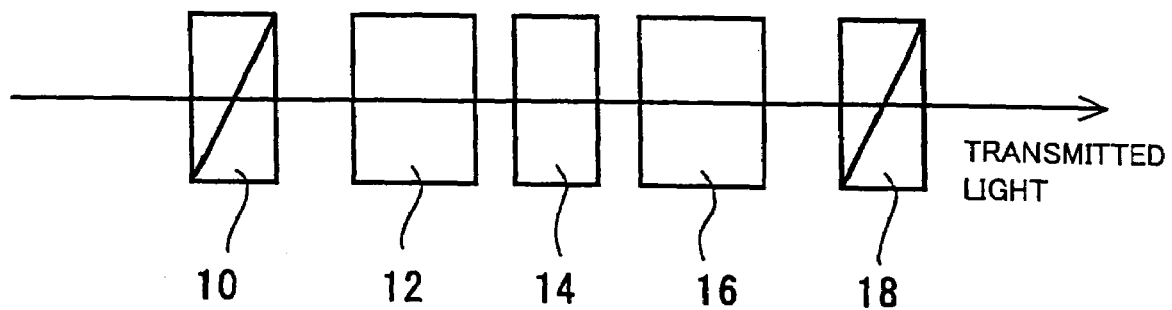
FIG. 3 is a configuration diagram of the present invention.
Figure 4:
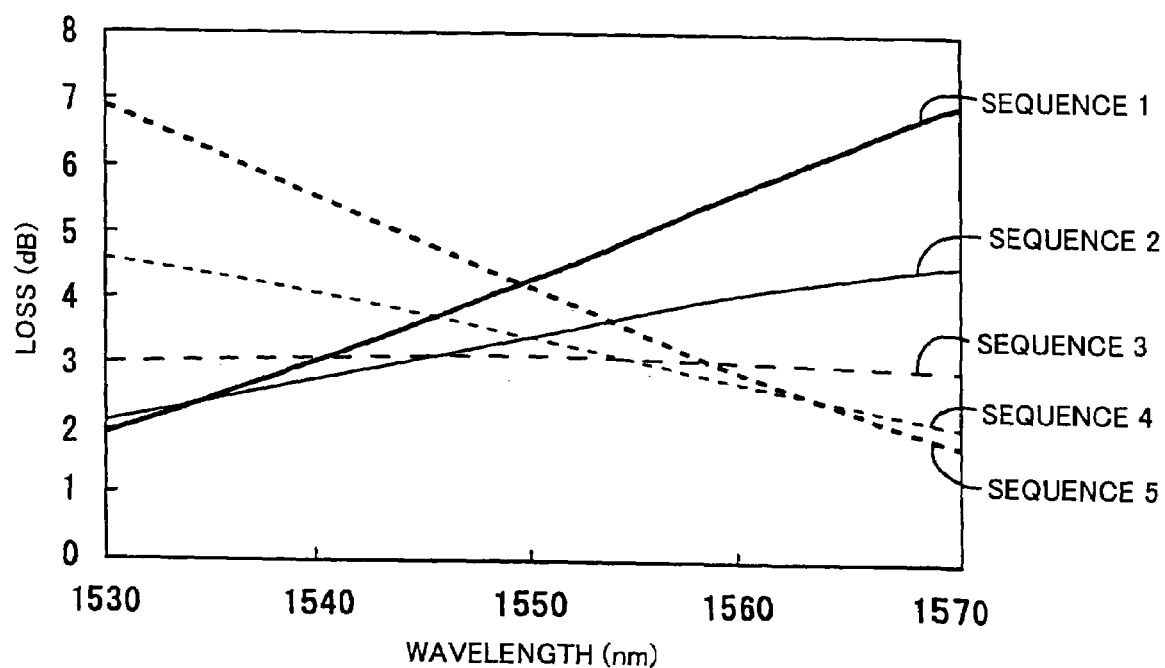
FIG. 4 is a graph showing an example of the loss vs. wavelength characteristic according to the present invention.
Figure 5:
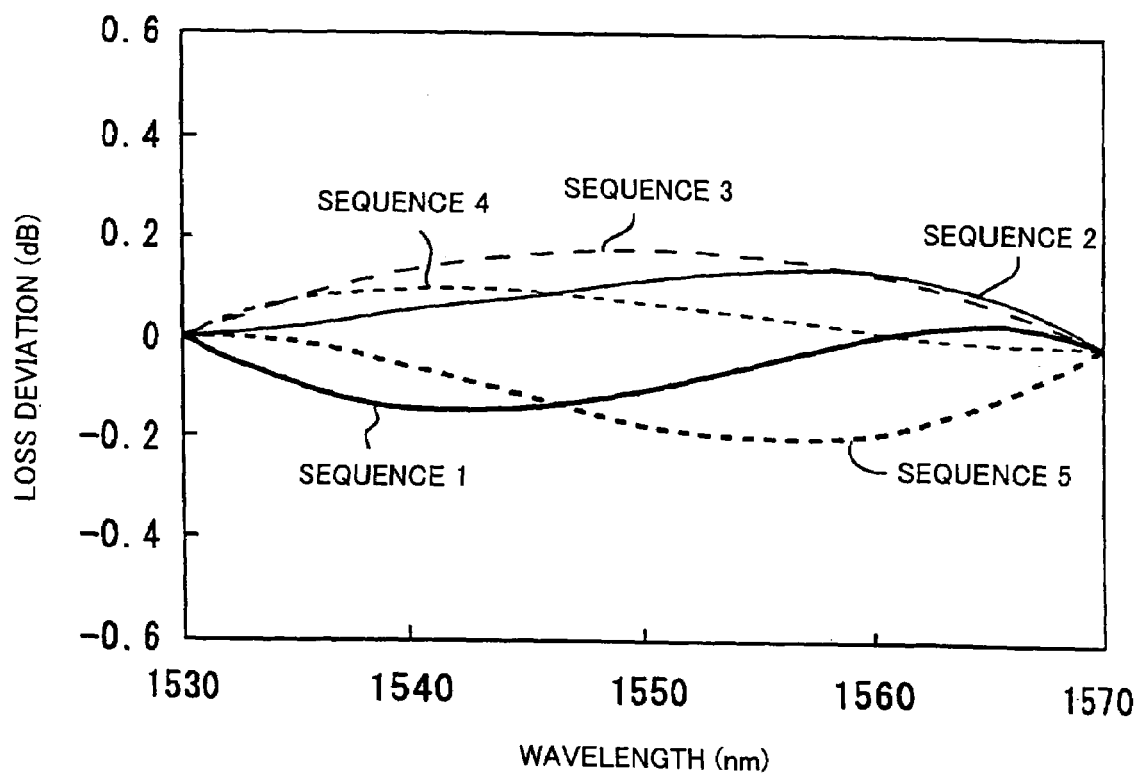
FIG. 5 is a graph showing the linearity of the loss vs. wavelength characteristic according to the present invention.

In the configuration of the present invention shown in FIG. 3, Bi-substituted rare-earth iron garnet was used for the magneto-optical crystal of the variable Faraday rotator, whereas quartz was used for the first and second phase difference elements. It is to be noted that the reference numerals in FIG. 3 correspond to those in FIG. 1. As for the rotation direction of polarization, the counterclockwise rotation is assumed to be positive (Therefore, the rotation direction of the rotation angle $\theta$ of the Faraday rotator is also assumed to be positive.). The transmission band is 1530 to 1570 nm (bandwidth of 40 nm, center wavelength $\lambda_0 = 1550$ nm). The angle $\phi_1$ formed by the optic axis of the first phase difference element and the transmitted polarization azimuth of the first polarizer is set to $\phi_1=-6°$, the angle $\phi_2$ formed by the optic axis of the second phase difference element and the transmitted polarization azimuth of the first polarizer is set to $\phi_2=-34°$, and the angle $\delta$ formed by the transmitted polarization azimuths of the first and second polarizers is set to $\delta=8°$. FIGS. 4 and 5 show the loss vs. wavelength characteristic when the phase differences $\Delta_1$ and $\Delta_2$ of the first and second phase difference elements are $33/4\lambda_0$ and $21/4\lambda_0$ respectively. It is to be noted that FIG. 5 shows the loss deviation (departure from linearity).

As is apparent from FIGS. 4 and 5 showing the loss vs. wavelength characteristic, the linearity is maintained despite the increased slope (defined to be the difference in loss between the wavelengths at both ends). In FIGS. 4 and 5, sequences 1 to 5 correspond to different Faraday rotation angles, that is, to +5 dB, +2.5 dB, 0 dB, −2.5 dB and −5 dB slopes. The linearity of the loss vs. wavelength characteristic is evaluated based on the difference between the straight line connecting the loss values at the wavelengths at both ends of each slope and the loss at each wavelength. The linearity of ±0.2 dB is realized in the slope range between +5 dB and −5 dB.

Figure 9:
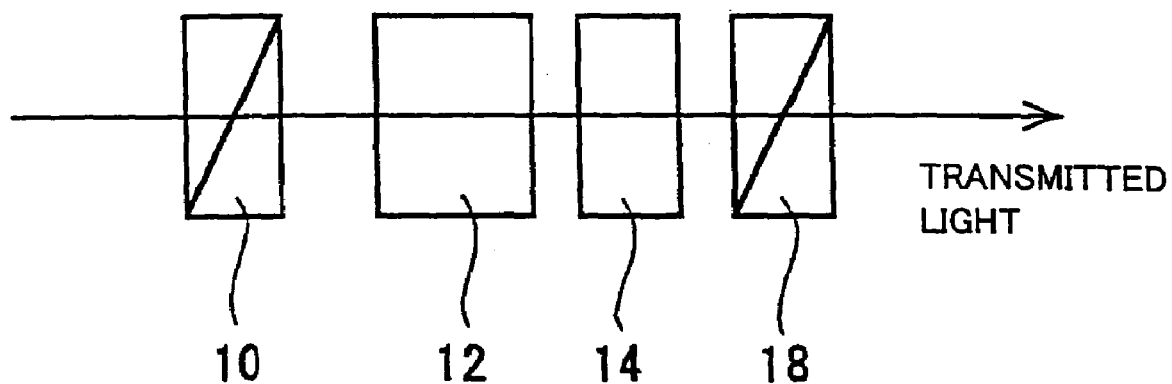
FIG. 9 is a configuration diagram of the prior art.
Figure 10:
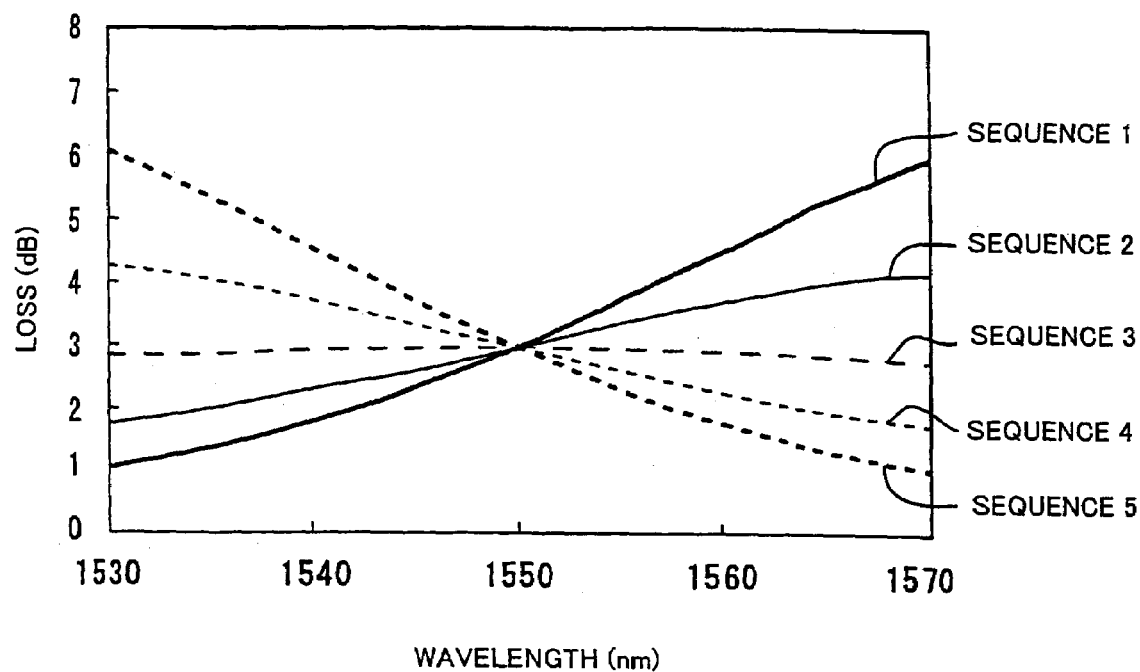
FIG. 10 is a graph showing an example of the loss vs. wavelength characteristic according to the prior art.
Figure 11:
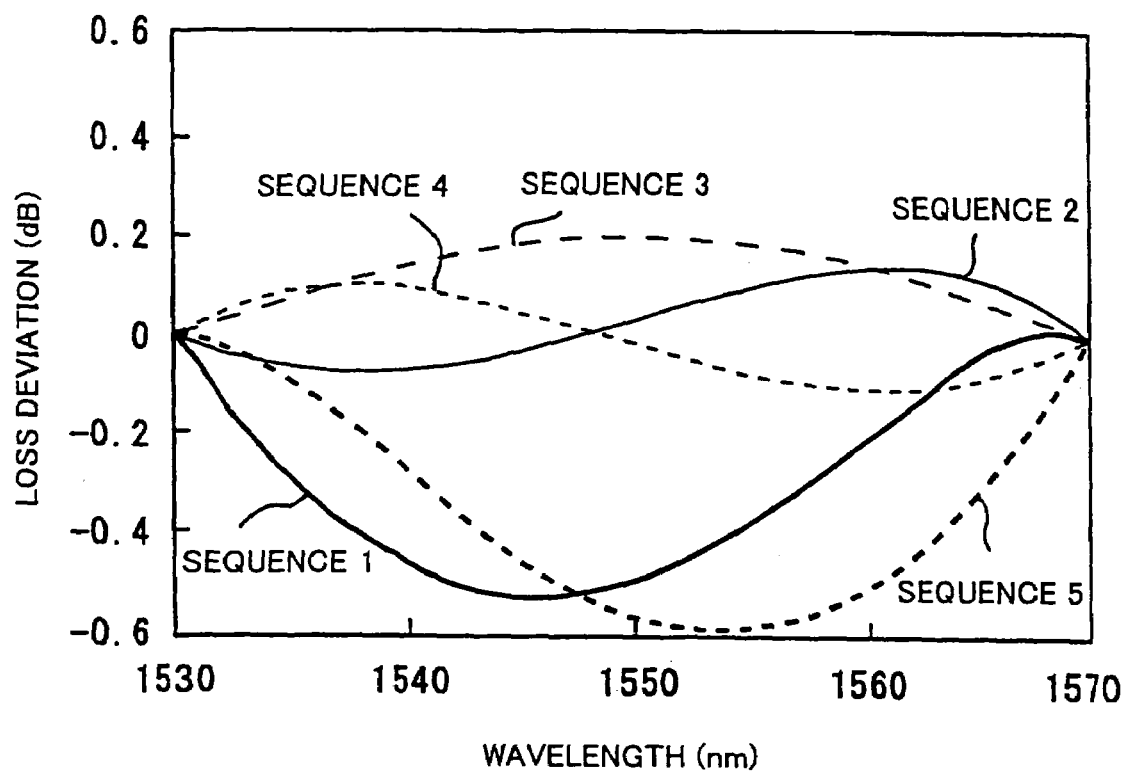
FIG. 11 is a graph showing the linearity of the loss vs. wavelength characteristic according to the prior art.

For comparison, the related art configuration shown in FIG. 9 has a linearity of +0.2 dB to −0.6 dB in the same range as shown in FIGS. 10 and 11.

Figure 6:
FIG. 6 is a graph showing the relationship between the loss slope and the mean insertion loss according to the present invention.
Figure 12:
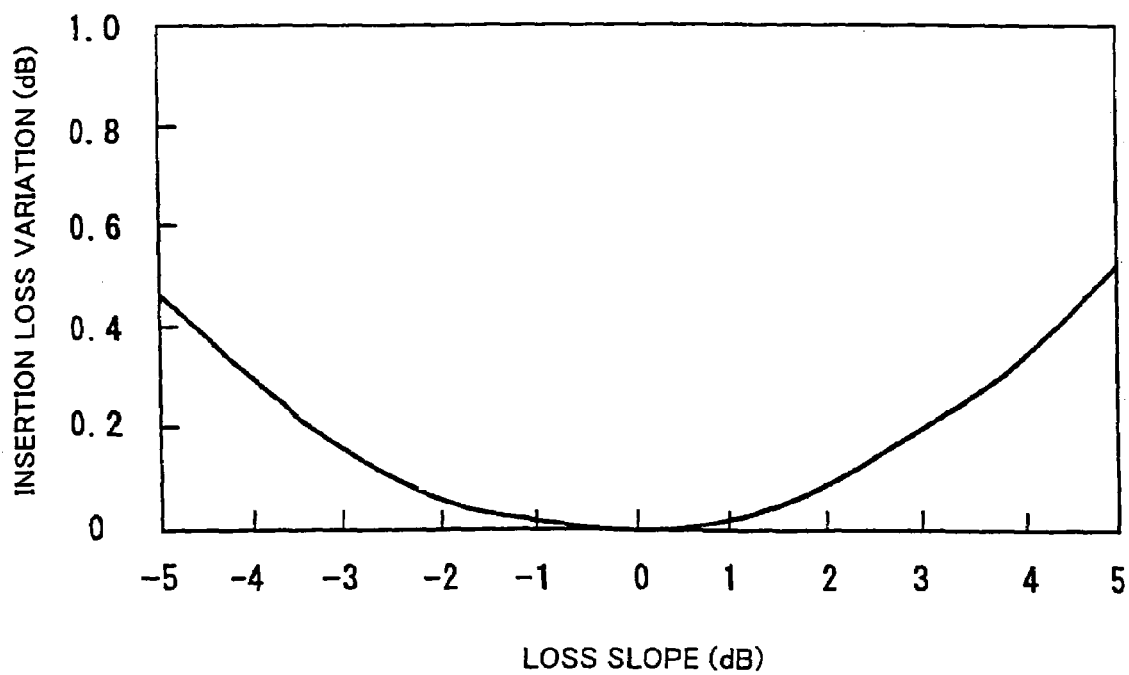
FIG. 12 is a graph showing the relationship between the loss slope and the mean insertion loss according to the prior art.

FIG. 6 shows an example of the slope dependency of the mean insertion loss (insertion loss variation-loss slope) in the configuration of the present invention shown in FIG. 3. It is to be noted that the mean insertion loss refers to the mean loss value at each wavelength. The transmission band is 1530 to 1570 nm (bandwidth of 40 nm, center wavelength $\lambda_0=1550$ nm). The angle $\phi_1$ formed by the optic axis of the first phase difference element and the transmitted polarization azimuth of the first polarizer is set to $\phi_1=-14°$, the angle $\phi_2$ formed by the optic axis of the second phase difference element and the transmitted polarization azimuth of the first polarizer is set to $\phi_2=-33°$, and the angle $\delta$ formed by the transmitted polarization azimuths of the first and second polarizers is set to $\delta=8°$. When the phase differences $\Delta_1$ and $\Delta_2$ of the first and second phase difference elements are $45/4\lambda_0$ and $29/4\lambda_0$ respectively, the mean insertion loss variation is 0.3 dB in the slope range between −5 dB and +5 dB. It is apparent that the variations in the mean insertion loss are suppressed as compared with the related art (0.5 dB in FIG. 12).

Figure 7:
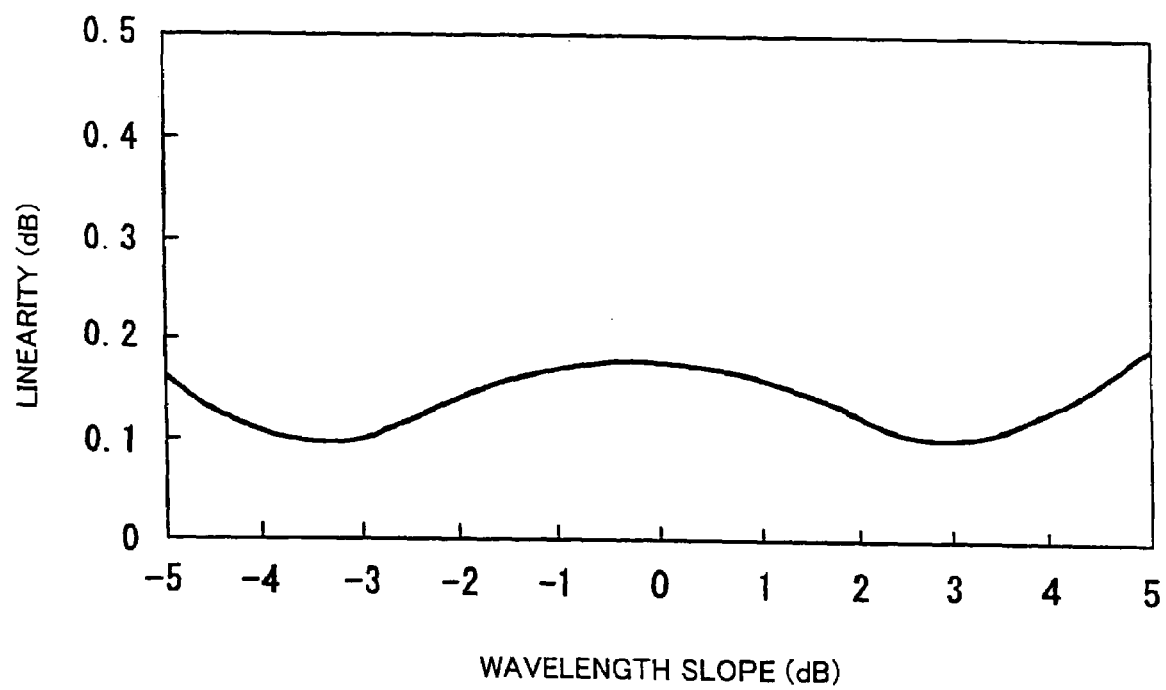
FIG. 7 is a graph showing the relationship between the wavelength slope and the linearity according to the present invention.

Further, FIG. 7 shows an example of the linearity of the wavelength slope (linearity-wavelength slope) in the configuration of the present invention shown in FIG. 3. It is to be noted that the linearity refers to the linearity when the loss vs. wavelength characteristic is expressed in logarithmic form. The transmission band is 1530 to 1570 nm (bandwidth of 40 nm, center wavelength $\lambda_0=1550$ nm). The angle $\phi_1$ formed by the optic axis of the first phase difference element and the transmitted polarization azimuth of the first polarizer is set to $\phi_1=-13°$, the angle $\phi_2$ formed by the optic axis of the second phase difference element and the transmitted polarization azimuth of the first polarizer is set to $\phi_2=-52°$, and the angle $\delta$ formed by the transmitted polarization azimuths of the first and second polarizers is set to $\delta=8°$. It is apparent that when the phase differences $\Delta_1$ and $\Delta_2$ of the first and second phase difference elements are $33/4\lambda_0$ and $21/4\lambda_0$ respectively (wavelength $\lambda=1590$ nm), the linearity is suppressed to 0.2 dB or less in the slope range between −5 dB and +5 dB.

Figure 8:
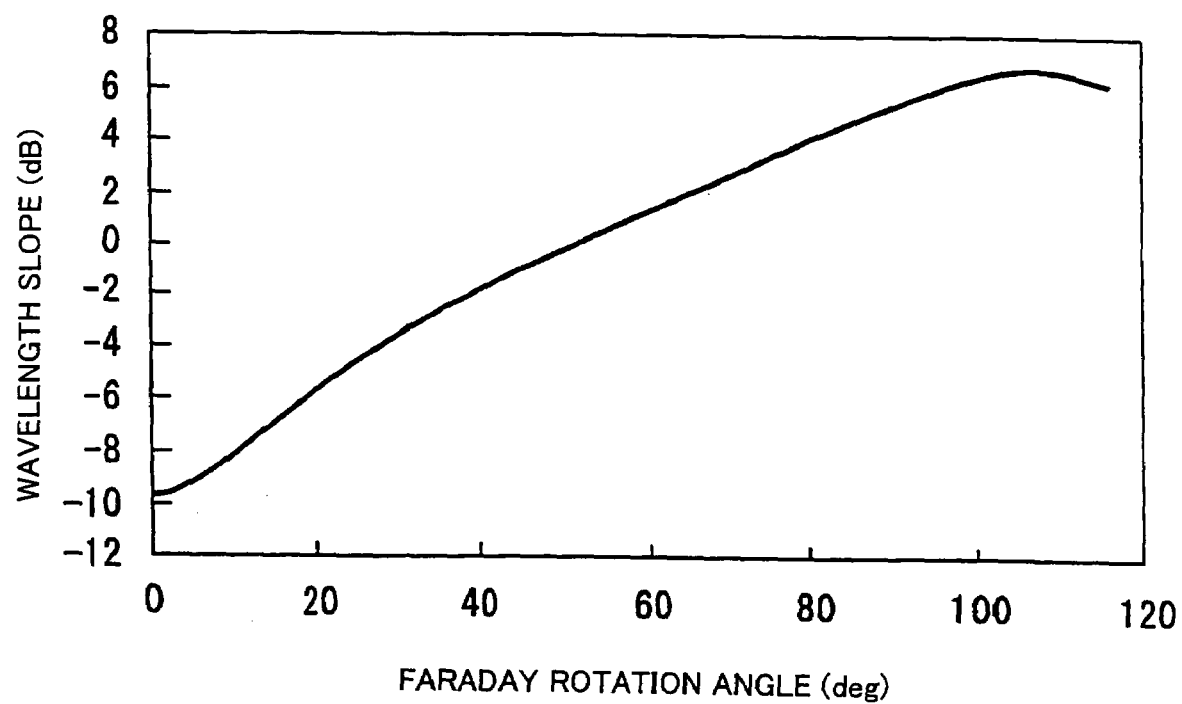
FIG. 8 is a graph showing the relationship between the Faraday rotation angle and the wavelength slope according to the present invention.

FIG. 8 shows the relationship between the Faraday rotation angle and the wavelength slope obtained under the same conditions as with FIG. 7. It is apparent that changing the Faraday rotation angle can continuously vary the wavelength slope.

As described above, the embodiment of the present invention provides a variable optical filter offering an excellent linearity (<±0.2 dB) over a wide operational slope range (linearity when transmittance is expressed in logarithmic form) thanks to the configuration having a phase difference element at the front and back of a variable Faraday rotator in the optical path and setting the optic axes of the two phase difference elements in different azimuths. This enhances the controllable range of wavelengths and makes a wider wavelength region applicable as the range of signal light, thus enabling large volume transmission.

While the preferred embodiment of the present invention has been described in detail, it should be understood that various changes, substitutions and modifications can be realized without departing from the spirit and scope of the invention as defined by the appended claims.

What is claimed is:

1. A variable optical filter comprising:
   a first polarizer;
   a first phase difference element operable to generate a phase difference;
   a variable Faraday rotator operable to impart a variable Faraday rotation;
   a second phase difference element operable to generate a phase difference: and
   a second polarizer,
   wherein said polarizers, said variable Faraday rotator, and said phase difference elements are arranged in the mentioned order along the optical axis,
   wherein when the angles formed by the optic axes of said first and second phase difference elements and the transmitted polarization azimuth of the first polarizer are assumed respectively to be $\phi_1$ and $\phi_2$, these $\phi_1$ and $\phi_2$ are set to different angles,
   wherein when the phase differences generated by the first and second phase difference elements are assumed to be $\Delta_1$ and $\Delta_2$ respectively, at least one of the phase differences is $(2n+1)\lambda/4$, where n is an integer and $\lambda$ is an arbitrary wavelength within a given transmission band, and
   wherein when the center wavelength in the given transmission band is assumed to be $\lambda_0$, the phase difference $\Delta_1$ of the first phase difference element is $13/4\lambda_0 \leq \Delta_1 \leq 49/4\lambda_0$, the phase difference $\Delta_2$ of the second phase difference element is $13/4\lambda_0 \leq \Delta_2 \leq 49/4\lambda_0$, and the variations in the mean insertion loss are 0.5 dB or less at the transmission bandwidth of 40 nm and over the wavelength slope from −5 dB to +5 dB.

2. A variable optical filter comprising:
   a first polarizer;
   a first phase difference element operable to generate a phase difference;
   a variable Faraday rotator operable to impart a variable Faraday rotation;
   a second phase difference element operable to generate a phase difference; and
   a second polarizer,
   wherein said polarizers, said variable Faraday rotator, and said phase difference elements are arranged in the mentioned order along the optical axis,
   wherein when the angles formed by the optic axes of said first and second phase difference elements and the transmitted polarization azimuth of the first polarizer are assumed respectively to be $\phi_1$ and $\phi_2$ these $\phi_1$ and $\phi_2$ are set to different angles, wherein when the phase differences generated by the first and second phase difference elements are assumed to be $\Delta_1$ and $\Delta_2$ respectively, at least one of the phase differences is $(2n+1)\lambda/4$, where n is an integer and $\lambda$ is an arbitrary wavelength within a given transmission band, and wherein when the center wavelength in the given transmission band is assumed to be $\lambda_0$, the phase difference $\Delta_1$ of the first phase difference element is $13/4\lambda_0 \leq \Delta_1 \leq 49/4\lambda_0$, the phase difference $\Delta_2$ of the second phase difference element is $13/4\lambda_0 \leq \Delta_2 \leq 49/4\lambda_0$, and wherein the linearity of the loss vs. wavelength characteristic is 0.2 dB or less and the transmission bandwidth of 40 nm and over the wavelength slope from −5 dB to +5 dB.

3. A variable optical filter comprising:

a first polarizer;

a first phase difference element operable to generate a phase difference;

a variable Faraday rotator operable to impart a variable Faraday rotation;

a second phase difference element operable to generate a phase; and a second polarizer, wherein said polarizers, said variable Faraday rotator, and said phase difference elements are arranged in the mentioned order along the optical axis, wherein when the angles formed by the optic axes of said first and second phase difference elements and the transmitted polarization azimuth of the first polarizer are assumed respectively to be $\phi_1$ and $\phi_2$, these $\phi_1$ and $\phi_2$ are set to different angles, wherein when the phase differences generated by the first and second phase difference elements are assumed to be $\Delta_1$ and $\Delta_2$ respectfully, at least one of the phase differences is $(2n+1)\lambda/4$, where n is an integer and $\lambda$ is an arbitrary wavelength within a given transmission band, and wherein when the center wavelength in the given transmission band is assumed to be $\lambda_0$ and the wavelength outside the band is $\lambda$, the phase difference $\Delta_1$ of the first phase difference element is $13/4\lambda_0 \leq \Delta_1 \leq 49/4\lambda_0$, the phase difference $\Delta_2$ of the second phase difference element is $13/4\lambda_0 \leq \Delta_2 \leq 49/4\lambda_0$, and wherein the linearity of the loss vs. wavelength characteristic is 0.2 dB or less and the variable slope range is −6.5 dB to +6.5 dB at the transmission bandwidth of 40 nm and over the wavelength slope from −5 dB to +5 dB.

4. A variable optical filter comprising:

a first polarizer;

a first phase difference element operable to generate a phase difference;

a variable Faraday rotator operable to impart a variable Faraday rotation;

a second phase difference element operable to generate a phase difference; and a second polarizer, wherein said polarizers, said variable Faraday rotator, and said phase difference elements are arranged in the mentioned order along the optical axis, wherein when the angles formed by the optic axes of said first and second phase difference elements and the transmitted polarization azimuth of the first polarizer are assumed respectively to be $\phi_1$ and $\phi_2$, these $\phi_1$ and $\phi_2$ are set to different angles, and wherein the first and second polarizers are in the shape of a wedge and made of a birefringence material, wherein the polarizers are arranged such that the top and bottom portions thereof are oriented in opposite directions to each other, wherein the first and second phase difference elements are in the shape of a flat plate, and wherein the optic axis azimuths of the first polarizer and the first phase difference element are orthogonal to each other when viewed in the direction of the optical axis.

5. A variable optical filter comprising:

a first polarizer;

a first phase difference element operable to generate a phase difference;

a variable Faraday rotator operable to impart a variable Faraday rotation;

a second phase difference element operable to generate a phase difference; and a second polarizer, wherein said polarizers, said variable Faraday rotator, and said phase difference elements are arranged in the mentioned order along the optical axis, wherein when the angles formed by the optic axes of said first and second phase difference elements and the transmitted polarization azimuth of the first polarizer are assumed respectively to be $\phi_1$ and $\phi_2$, these $\phi_1$ and $\phi_2$ are set to different angles, and wherein the first and second phase difference elements are formed with different materials so that the refraction index variation vs. temperature characteristics of the two elements are opposite in sign.

6. A variable optical filter comprising:

a first polarizer;

a first phase difference element operable to generate a phase difference;

a variable Faraday rotator operable to impart a variable Faraday rotation, a second phase difference element operable to generate a phase difference; and second polarizer, wherein said polarizers, said variable Faraday rotator, and said phase difference elements are arranged in the mentioned order along the optical axis, wherein when the rotation direction of a rotation angle θ of said Faraday rotator is positive, an angle δ formed by the transmitted polarization azimuths of the first and second polarizers is set δ<0, the angle $\phi_1$ formed by the optic axis of the first phase difference element and the transmitted polarization azimuth of the first polarizer is set $\phi_1$<0, and the angle $\phi_2$ formed by the optic axis of the second phase difference element and the transmitted polarization azimuth of the first polarizer is set $\phi_2$<0, and wherein the angles $\phi_1$ and $\phi_2$ are set $\phi_1 \neq \phi_2$.

7. A variable optical filter of claim 6, wherein when the phase differences generated by the first and second phase difference elements are assumed to be $\Delta_1$ and $\Delta_2$ respectively, at least one of the phase differences is $(2n+1)\lambda/4$ within a transmission band given in advance where $\lambda$ is an arbitrary wavelength within the given transmission band.

8. A variable optical filter of claim 7, wherein when the center wavelength in the given transmission band is assumed to be $\lambda_0$, the phase difference $\Delta_1$ of the first phase difference element is $13/4\lambda_0 \leq \Delta_1 \leq 49/4\lambda_0$, the phase difference $\Delta_2$ of the second phase difference element is $13/4\lambda_0 \leq \Delta_2 \leq 49/4\lambda_0$, and the variations in the mean insertion loss are 0.5 dB or less at the transmission bandwidth of 40 nm and over the wavelength slope from −5 dB to +5 dB.

9. A variable optical filter of claim 7, wherein when the center wavelength in the given transmission band is assumed to be $\lambda_0$, the phase difference $\Delta_1$ of the first phase difference element is $13/4\lambda_0 \leq \Delta_1 \leq 49/4\lambda_0$, the phase difference $\Delta_2$ of the second phase difference element is $13/4\lambda_0 \leq \Delta_2 \leq 49/4\lambda_0$, and wherein the linearity of the loss vs. wavelength characteristic is 0.2 dB or less at the transmission bandwidth of 40 nm and over the wavelength slope form −5 dB to +5 dB.

10. A variable optical filter of claim 7, wherein when the center wavelength in the given transmission band is assumed to be $\lambda_0$ and the wavelength outside the band is $\lambda$, the phase difference $\Delta_1$ of the first phase difference element is $13/4\lambda_0 \leq \Delta_1 \leq 49/4\lambda_0$, the phase difference $\Delta_2$ of the second phase difference element is $13/4\lambda_0 \leq \Delta_2 \leq 49/4\lambda_0$, and wherein the linearity of the loss vs. wavelength characteristic is 0.2 dB or less and the variable slope range is −6.5 dB to +6.5 dB at the transmission bandwidth of 40 nm and over the wavelength slope from −5 dB to +5 dB.

11. A variable optical filter of claim 6, wherein the Faraday rotator comprises:
a magneto-optical crystal provided in the optical path;
a first magnetic field application device operable to magnetically saturate the magneto-optical crystal; and
a second magnetic field application device operable to apply a variable magnetic field in the direction not parallel to the direction of the magnetic field applied by the first magnetic field application device.

12. A variable optical filter of claim 6, wherein the first and second polarizers are in the shape of a wedge and made of a birefringence material, wherein the polarizers are arranged such that the top and bottom portions thereof are oriented in opposite directions to each other, wherein the first and second phase difference elements are in the shape of a flat plate, and wherein the optic axis azimuths of the first polarizer and the first phase difference element are orthogonal to each other when viewed in the direction of the optical axis.

13. A variable optical filter of claim 6, wherein the first and second phase difference elements are formed with different materials so that the refraction index variation vs. temperature characteristics of the two elements are opposite in sign.

* * * * *